United States Patent
Hartman et al.

(10) Patent No.: US 6,526,496 B1
(45) Date of Patent: Feb. 25, 2003

(54) BURST INSTRUCTION ALIGNMENT METHOD APPARATUS AND METHOD THEREFOR

(75) Inventors: Steven Paul Hartman, Round Rock, TX (US); Van Hoa Lee, Cedar Park, TX (US); Milton Devon Miller, II, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/422,364

(22) Filed: Oct. 21, 1999

(51) Int. Cl.[7] .............................................. G06F 12/04
(52) U.S. Cl. ...................................... 711/201; 710/135
(58) Field of Search ........................ 711/201, 144–145, 711/3, 210–212; 710/35, 62–64, 66, 72–74, 305–307; 712/204, 244

(56) References Cited

U.S. PATENT DOCUMENTS 5,577,200 A * 11/1996 Abramson et al. ............. 714/1
5,897,654 A * 4/1999 Eisen et al. ................. 711/131
5,996,048 A * 11/1999 Cherabuddi et al. ........ 711/122
6,438,653 B1 * 8/2002 Akashi et al. ............... 711/128

OTHER PUBLICATIONS

Mano, Computer System Architecture, pp. 312–317, 1982.*
Handy, The Cache Memory Book, pp. 48–76, 1998.*

* cited by examiner

*Primary Examiner*—Matthew Kim
*Assistant Examiner*—Denise Tran
(74) *Attorney, Agent, or Firm*—Barry S. Newberger; Winstead Sechrest & Minick P.C.; Mark E. McBurney

(57) ABSTRACT

A burst transfer alignment apparatus and method are provided. An interface between the word-aligned subsystem and the double-word-aligned system bus loads a predetermined invalid bit pattern on the system bus corresponding to the second word of the double-word access, in response to a misaligned read. When execution of the predetermined invalid pattern is attempted, an execution exception is thrown. In response the cache line containing the invalid pattern giving rise to the exception is invalidated at the address of the invalid instruction data. Returning from the exception to the address of the invalid pattern, the cache line is refetched. The refetch occurs on an even word boundary, and therefore the refetched cache line transfers properly because the even word address coincides with a double word boundary expected by the bus system.

14 Claims, 3 Drawing Sheets

BURST INSTRUCTION ALIGNMENT METHOD APPARATUS AND METHOD THEREFOR

TECHNICAL FIELD

The present invention relates in general to data processing systems, and in particular, to burst instruction transfers from I/O subsystems in data processing systems.

BACKGROUND INFORMATION

In a modem data processing systems, a stream of instructions is often transferred from main memory into a cache memory in a burst read operation. The burst read transfers a plurality of instruction "words" which fills a cache line. (An instruction "word" includes a predetermined number of bits which constitute the instruction, which number of bits may be depend on the processor implementation.) Burst instruction transfers from a subsystem designed and optimized for transfers on word boundaries and a system bus designed and optimized for transfers on double word boundaries may give rise to misaligned reads. This may typically occur through devices that interface to the system bus through an input/output (I/O) subsystem. Exemplary implementations in which an instruction stream may be accessed through an I/O subsystem include initial program load read-only storage (IPLROS) and initialization or diagnostic code resident on I/O adapters.

Typically, to prevent misaligned reads, the I/O subsystem must be selected to be compatible with the system bus. This complicates the development of data processing system, particularly, as processor technology advances rapidly with a concomitant increase in system bus widths. Thus, there is a need in the art for a mechanism to align instruction reads across otherwise incompatible subsystems on a system bus.

SUMMARY OF THE INVENTION

The aforementioned needs are addressed by the present invention. Accordingly, there is provided, in a first form, a burst transfer alignment method. The method includes invalidating a cache line, in which the cache line includes at least one entry containing a predetermined data value representing an invalid instruction, the predetermined data value being loaded in response to detecting an unaligned read. The cache line is refetched at the address of the invalid instruction whereby an aligned transfer of the refetched line is effected.

There is also provided, in a second form, a data processing system. The system contains circuitry operable for invalidating a cache line, wherein the cache line includes at least one entry containing a predetermined data value representing an invalid instruction. System circuitry loads the predetermined data value in the cache line in response to circuitry operable for detecting an unaligned read. Also included is circuitry operable for returning to a selected one of the at least one entry containing an invalid instruction. A refetch of the invalidated cache line generates an aligned transfer.

Additionally, there is provided, in a third form, a computer program product operable for storage in machine readable storage media, the program product operable for burst transfer alignment. The program product includes programming for invalidating a cache line, wherein said cache line includes at least one entry containing a predetermined data value representing an invalid instruction. The program product also has programming for returning to a preselected one of said at least one entry containing an invalid instruction. A refetch of the invalidated cache line generates an aligned transfer.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
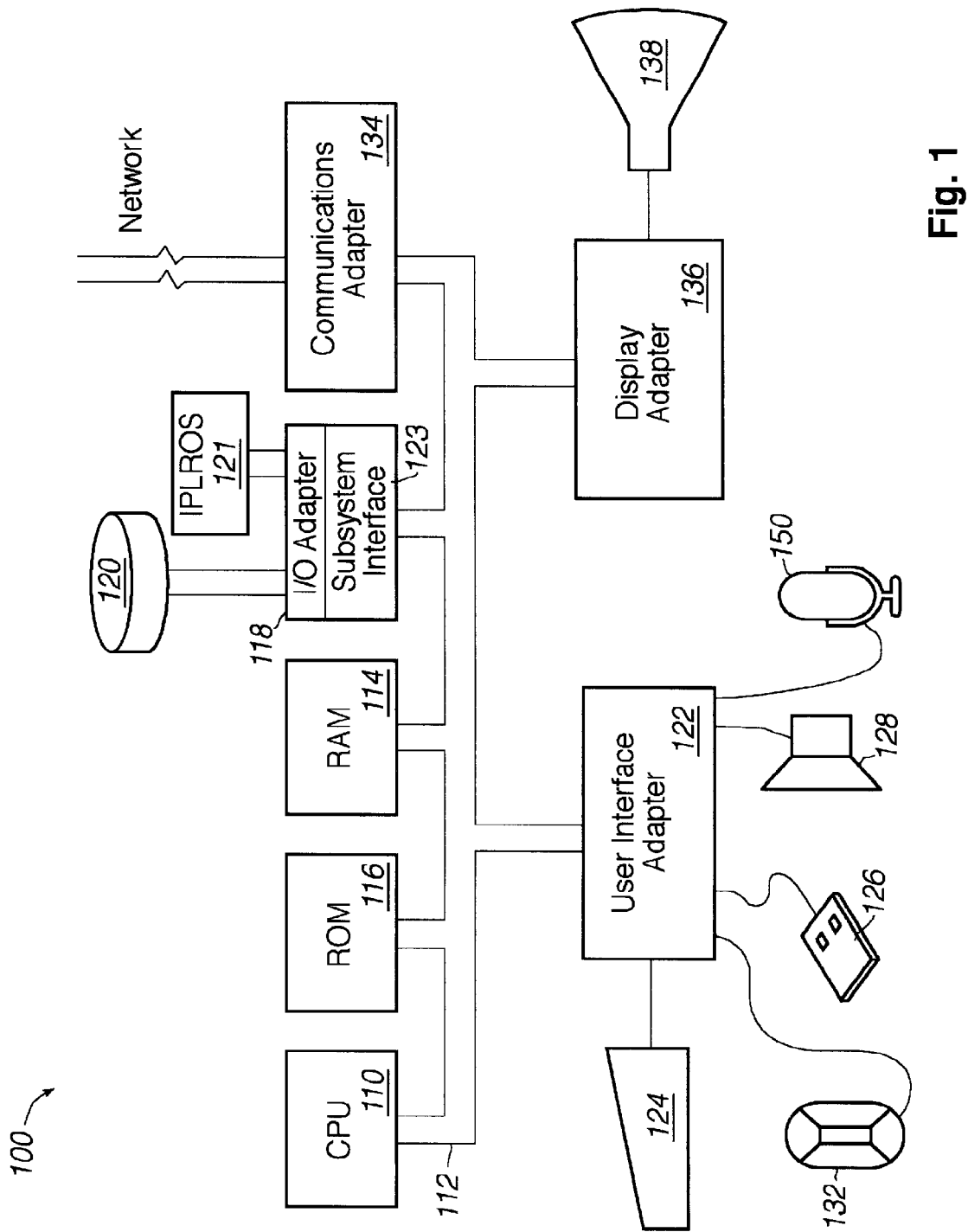
FIG. 1 illustrates, in block diagram form, a data processing system in accordance with an embodiment of the present invention.

A mechanism to align burst transfers is provided. An interface between the word-aligned subsystem and the double-word-aligned system bus loads a predetermined invalid bit pattern on the system bus corresponding to the second word of the double-word access, in response to a misaligned read. When execution of the predetermined invalid pattern is attempted, an execution exception is thrown. In response the cache line containing the invalid pattern giving rise to the exception is invalidated at the address of the invalid instruction data. Returning from the exception to the address of the invalid pattern, the cache line is refetched. The refetch occurs on an even word boundary, and therefore the refetched cache line transfers properly because the even word address coincides with a double word boundary expected by the bus system.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring first to FIG. 1, an example is shown of a data processing system 100 which may be used for the invention. The system has a central processing unit (CPU) 110, which is coupled to various other components by system bus 112. Read only memory ("ROM") 116 is coupled to the system bus 112 and includes a basic input/output system ("BIOS")

that controls certain basic functions of the data processing system 100. The methodology of the present invention may be embodied as instructions in ROM 116. Random access memory ("RAM") 114,I/O adapter 118, and communications adapter 134 are also coupled to the system bus 112. I/O adapter 118 communicates with disk storage device 120 as well as initial program load read only storage (IPLROS) 121. I/O adapter 118 includes subsystem interface 123 which may perform a portion of the methodology of the present invention, described further in conjunction with FIG. 2. Communications adapter 134 interconnects bus 112 with an outside network enabling the data processing system to communicate with other such systems. Input/Output devices are also connected to system bus 112 via user interface adapter 122 and display adapter 136. Keyboard 124, track ball 132, mouse 126 and speaker 128 are all interconnected to bus 112 via user interface adapter 122. Display monitor 138 is connected to system bus 112 by display adapter 136. In this manner, a user is capable of inputting to the system throughout the keyboard 124, trackball 132 or mouse 126 and receiving output from the system via speaker 128 and display 138.

Preferred implementations of the invention include implementations as a computer system programmed to execute the method or methods described herein, and as a computer program product. According to the computer system implementation, sets of instructions for executing the method or methods are resident in the random access memory 114 and ROM 116 of one or more computer systems configured generally as described above. Until required by the computer system, the set of instructions may be stored as a computer program product in another computer memory, for example, in disk drive 120 (which may include a removable memory such as an optical disk or floppy disk for eventual use in the disk drive 120). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Figure 2:
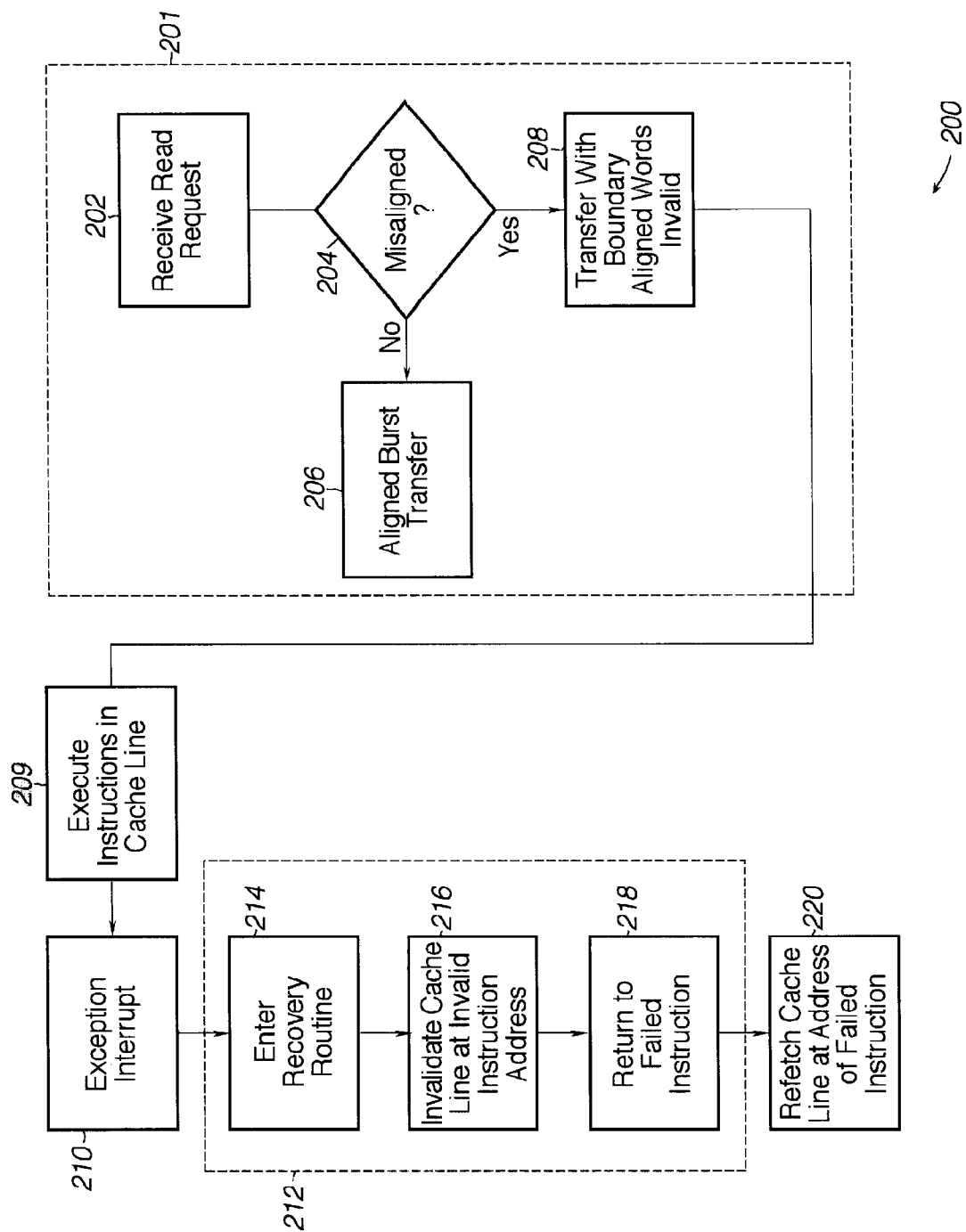
FIG. 2 illustrates, in flow chart form, a methodology in accordance with an embodiment of the present invention.

Refer now to FIG. 2, illustrating a flow diagram of burst transfer alignment methodology 200. Portion 201 of methodology 200, including steps 202, 204, 206 and 208 may be performed by a subsystem interface, such as interface 123, FIG. 1.

Figure 3:
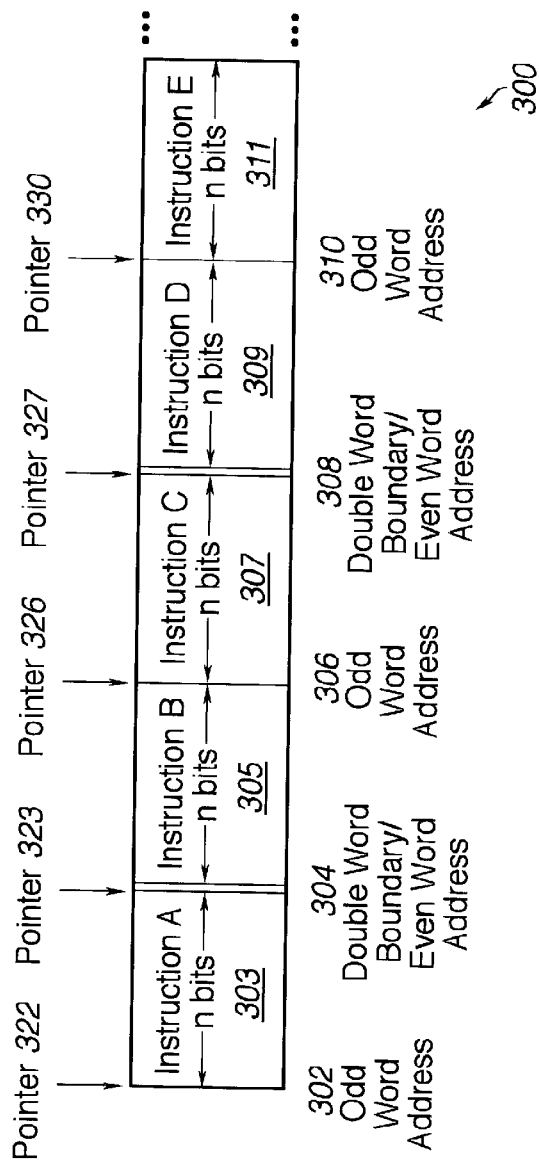
FIG. 3 schematically illustrates a segment of subsystem memory which may be used in conjunction with the present invention.

In step 202 a read request is received, and in step 204 it is determined if the read is misaligned. Such misalignment may result from an odd word read request address on a system bus, such as bus 112, FIG. 1, which is double word aligned. If the request is not misaligned, instructions are burst sequentially, step 206. Thus, in the exemplary double-word system bus, n-bit instructions are sent pair-wise in 2n-bit transfers. This may be understood by referring to FIG. 3, schematically illustrating a segment 300 of subsystem memory on a bus system designed for transfers on double word boundaries, such as double word boundary/even word address 304 and double word boundary/even word address 308. Segment 300 includes a plurality of entries 303–311, each of which is n bits wide, holding instructions A–E, respectively. A burst read targeted at an even word boundary/double word address, such as address 304 transfers instructions B and C, fields 305, 307, D and E, fields 309 and 311, etc., corresponding to pointers 323, 327, etc., wherein the pointers are incremented by the width of a double word, corresponding to 2n bits.

If, however, a misaligned read is requested, for example at an odd word address, such as odd word address 302, FIG. 3, methodology 200 proceeds to step 208 via the "Yes" branch in step 204. This typically occurs, for example, when a branch instruction target resolves to an odd word address.

A burst read targeted at odd word address 302 transfers instruction A in entry 303, addressed by pointer 322 pointing to the odd word address 302. For the next transfer in the burst, the bus system increments pointer 322 by the width of a double word, corresponding to 2n bits. (It would be understood by an artisan of ordinary skill that such misalignments may occur whenever the system bus is designed for transfers that are aligned to boundaries that coincide with an even multiple of a receiving subsystem instruction boundary. Thus, a quad word bus system may also give rise, for example, to misalignment with burst transfers to a receiving subsystem designed for double word transfers.) The next instruction data sent is thus n bits constituting instruction C. Likewise, each succeeding transfer in the burst increments the pointer by an amount corresponding to the width of a double word, to pointer 326, 330, and so forth, until the burst transfer ends.

Additionally, because the bus is 2n bits wide, between instructions A, C, E, etc., which are valid, a predetermined invalid bit pattern, which may in an embodiment of the present invention be n "1"s, is loaded onto the system bus, such as bus 112, FIG. 1 by the subsystem interface, for example, interface 123. It would be understood by an artisan of ordinary skill that other predetermined invalid patterns may be used, and such embodiments would be within the spirit and scope of the present invention. Thus, at the conclusion of a burst read, the cache line may be as shown in FIG. 4, schematically illustrating such an exemplary cache line 400.

Cache line 400 includes a plurality of entries 402–416, each of which may include an instruction n bits in width. Entries 402, 406, 410, . . . , 416 include instructions A, C, E, and G, respectively. However, because of the burst transfer misalignment, entries 404, 408, 412, . . . , 414 contain the predetermined invalid pattern, which as described hereinabove, may be all "1"s. (Shading shown in FIG. 4 denotes invalid instruction data in cache line 400.)

Figure 4:
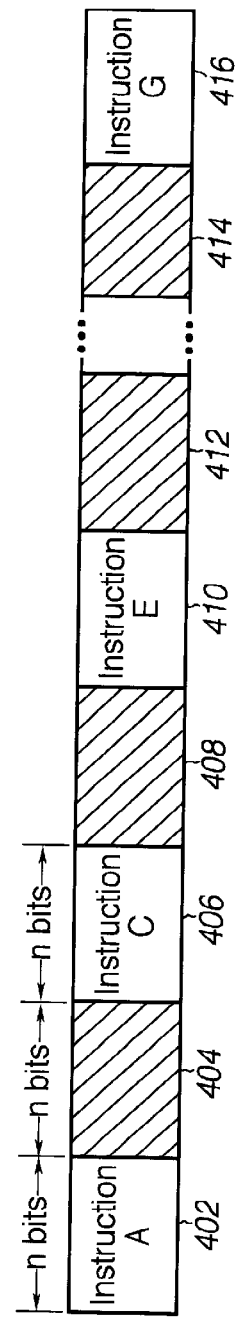
FIG. 4 schematically illustrates a cache line which may be used in conjunction with the present invention.

In step 209, instructions in the cache line, such as cache line 400 in FIG. 4 are executed. The "odd word" instructions, A, C, E, etc. are valid, and may be successfully executed. However, the invalid patterns at the aligned addresses, corresponding to fields 404, 408, 412, 416, etc. in cache line 400, are not executable. In step 210, an exception is thrown in response to an attempt to execute, in step 209, an invalid pattern in the cache line, such as cache line 400, FIG. 4, from a burst transfer into the cache line at an odd word boundary. The exception may be detected by invalid instruction check logic in the processor, such as CPU 110, FIG. 1. Interrupt logic in the CPU saves a pointer to the address in the instruction sequence where the interrupt occurred. The exception interrupt then invokes recovery routine 212, which includes steps 214, 216, and 218, by passing to a pointer to the address of recovery routine 212. Recovery routine 212 may be incorporated in the initial program load (IPL) firmware, which may be included in read-only storage (ROS), for example IPLROS 121, FIG. 1.

Recovery routine 212 is entered in step 214, which may be at a predetermined address in the IPLROS, pointed to by the aforementioned pointer to recovery routine 212. In step 216, the cache line containing the invalid pattern is invalidated at the address of the invalid pattern. For example, in cache line 400, FIG. 4, the cache line may be invalidated at the address corresponding to entry 404. In step 216, recovery routine 212 returns to the address of the invalid instruction data that caused the exception to be thrown in step 210, which address was saved by the CPU exception logic, as described above, and is available to recovery routine 212. Because the cache line failed, the cache line is refetched, step 220. However, since the instruction that failed is on an even word boundary, the refetch, at the address of the failed instruction, will align to the double word boundary of the bus system, and the cache line will transfer successfully.

In this way, a mechanism to align burst transfers is provided, wherein the invalid data passed in the transfer because of boundary misalignment across subsystems is detectable by the processor. The system operates normally, without special means to detect the conditions unique to the problem to thereby prevent its occurrence, rather the mechanism detects when the problem occurs and corrects the invalid result. When a burst transfer targets an odd word address, all the even words in the burst, or cache line, will contain a predetermined invalid pattern loaded by the subsystem interface. An attempt to execute the invalid pattern will result in an exception interrupt causing the program execution to be switched to a recovery routine. Because the implementation may be contained completely within the IPL firmware, the implementation may have reduce impacts to product cost, schedule or performance as compared with a solution which requires that the sender and receiver be designed to work a specific alignment protocol. Moreover, once the misaligned data has been refetched, the correction is permanently cached. Thus, for example, a subsequent branch to odd addresses in the address range will access "good" data from the cache.

Although the present invention and its advantages have been described in detail, it should be understood that various changes, substitutions and alterations can be made herein without departing from the spirit and scope of the invention as defined by the appended claims.

What is claimed is:

1. A burst transfer alignment method comprising the steps of:
   invalidating a cache line, wherein said cache line includes at least one entry containing a predetermined data value representing an invalid instruction; and
   returning to a first one of said at least one entry;
   wherein said invalidating and returning steps are invoked in response to a hardware exception generated in response to said predetermined data value, wherein said hardware exception is thrown in response to a branch instruction target resolving to an odd word boundary in a memory subsystem.

2. The method of claim 1 further comprising the step of refetching said cache line, wherein a refetch request in response to said refetching step corresponds to an address of said predetermined data value.

3. The method of claim 1, wherein said predetermined data value comprises a plurality of bits having a predetermined pattern.

4. The method of claim 1, wherein said predetermined data value is loaded in said cache line in response to a misaligned read request.

5. The method of claim 4 further comprising the steps of:
   detecting said misaligned read by a subsystem interface; and
   loading said predetermined data value on a system bus by said subsystem interface.

6. A data processing system comprising:
   a central processing unit (CPU) including circuitry operable for invalidating a cache line;
   a system bus coupled to said CPU operable for communicating instructions to said cache line; and
   a storage subsystem operable for providing instructions to said cache line via a subsystem interface coupled to said system bus said subsystem interface operable for loading a predetermined data value representing an invalid instruction in at least one entry in said cache line via said system bus; and
   wherein said predetermined data value is loaded on said system bus by said subsystem interface in response to a misaligned read request to said storage subsystem.

7. The data processing system of claim 6 further comprising circuitry operable for refetching said cache line, wherein a refetch request generated by said circuitry corresponds to an address of said predetermined data value.

8. The data processing system of claim 6 wherein said circuitry operable for invalidating and circuitry operable for returning are invoked in response to a hardware exception generated in response to said predetermined data value.

9. The data processing system of claim 6 wherein said predetermined data value comprises a plurality of bits having a predetermined pattern.

10. A computer program product operable for storage in machine readable storage media, the program product operable for burst transfer alignment, the program product comprising:
    programming for invalidating a cache line, wherein said cache line includes at least one entry containing a predetermined data value representing an invalid instruction; and
    programming for returning to a first one of said at least one entry;
    wherein said programming for invalidating and returning are invoked in response to a hardware exception generated in response to said predetermined data value, wherein said hardware exception is thrown in response to a branch instruction target resolving to an odd word boundary in a memory subsystem.

11. The program product of claim 10 further comprising programming for refetching said cache line, wherein a refetch request in response to said programming corresponds to an address of said predetermined data value.

12. The program product of claim 10 wherein said predetermined data value comprises a plurality of bits having a predetermined pattern.

13. The program product of claim 10 wherein said predetermined data value is loaded in said cache line in response to a misaligned read request.

14. The program product of claim 13 wherein a subsystem interface loads said predetermined data value on a system bus operable for communicating instructions to said cache line in response to said misaligned read request.

* * * * *